United States Patent
Liang (10) Patent No.: US 11,263,661 B2
(45) Date of Patent: Mar. 1, 2022

(54) OPTIMAL VIEW CORRECTION FOR CONTENT

(71) Applicant: Microsoft Technology Licensing, LLC, Redmond, WA (US)

(72) Inventor: Keqing Liang, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 59 days.

(21) Appl. No.: 16/895,587

(22) Filed: Jun. 8, 2020

(65) Prior Publication Data

US 2020/0302477 A1    Sep. 24, 2020

Related U.S. Application Data

(63) Continuation-in-part of application No. 16/232,862, filed on Dec. 26, 2018, now abandoned.

(51) Int. Cl.
*G06Q 10/04* (2012.01)
*G06Q 30/02* (2012.01)
(Continued)

(52) U.S. Cl.
CPC ......... *G06Q 30/0246* (2013.01); *G06N 20/00* (2019.01); *G06Q 10/04* (2013.01);
(Continued)

(58) Field of Classification Search
None
See application file for complete search history.

(56) References Cited

U.S. PATENT DOCUMENTS 8,005,697 B1 * 8/2011 Cohen .............. G06Q 10/06311
                                                                705/7.13
8,732,015 B1 * 5/2014 Beckerman ........ G06Q 30/0242
                                                               705/14.46

(Continued)

OTHER PUBLICATIONS

Kan Ren, Weinan Zhang, Ke Chang, Yifei Rong, Yong Yu, Jun Wang. Bidding Machine: Learning to Bid for Directly Optimizing Profits in Display Advertising. IEEE Transactions on Knowledge and Data Engineering, vol. 30, Issue: 4, Apr. 2018, pp. 1-18 (Year: 2018).*

(Continued)

*Primary Examiner* — Jamie H Austin
(74) *Attorney, Agent, or Firm* — Schwegman Lundberg & Woessner, P.A.

(57) ABSTRACT

In an example embodiment, a bid of an impression of a piece of content, while dynamically set at impression time, may be based on a base bid that is something of a rough indicator of what the estimated price will be. That base bid then is adjusted dynamically up or down at impression time. This base bid can be determined by dividing the expected number of impressions for a day by a total daily budget. The expected number of impressions may be determined by using the empirical number of impressions from the previous day. As such, in an example embodiment, the prediction of the number of impressions for a day utilizes a corrected version of the empirical number of impressions from the prior day, with the corrected version based on a specialized formula with weights trained by a machine learning algorithm.

17 Claims, 7 Drawing Sheets

(51) Int. Cl.
*G06N 20/00* (2019.01)
*G06Q 10/10* (2012.01)
*G06N 3/08* (2006.01)

(52) U.S. Cl.
CPC ..... *G06Q 10/1053* (2013.01); *G06Q 30/0249* (2013.01); *G06Q 30/0269* (2013.01); *G06Q 30/0275* (2013.01); *G06N 3/08* (2013.01)

(56) References Cited

U.S. PATENT DOCUMENTS

| | | | | |
|---|---|---|---|---|
| 10,489,821 | B2* | 11/2019 | Soloff | G06Q 30/0283 |
| 2002/0072946 | A1* | 6/2002 | Richardson | G06Q 10/1053 |
| | | | | 705/7.14 |
| 2007/0038508 | A1* | 2/2007 | Jain | G06Q 30/02 |
| | | | | 705/14.41 |
| 2008/0027783 | A1* | 1/2008 | Hughes | G06Q 10/00 |
| | | | | 705/7.14 |
| 2009/0063273 | A1* | 3/2009 | Dixon | G06Q 30/0207 |
| | | | | 705/14.1 |
| 2009/0204470 | A1* | 8/2009 | Weyl | G06Q 10/06 |
| | | | | 705/7.13 |
| 2009/0259550 | A1* | 10/2009 | Mihelich | G06Q 30/02 |
| | | | | 705/14.42 |
| 2009/0327032 | A1* | 12/2009 | Gunawardana | G06Q 30/02 |
| | | | | 705/14.42 |
| 2010/0138291 | A1* | 6/2010 | Silverman | G06Q 30/0242 |
| | | | | 705/14.45 |
| 2010/0280866 | A1* | 11/2010 | Moon | G06Q 30/02 |
| | | | | 705/14.49 |
| 2011/0131082 | A1* | 6/2011 | Manser | G06Q 10/06 |
| | | | | 705/7.42 |
| 2011/0166927 | A1* | 7/2011 | Bandi | G06Q 30/0246 |
| | | | | 705/14.45 |
| 2014/0108103 | A1* | 4/2014 | Romaine | G06Q 10/06395 |
| | | | | 705/7.41 |
| 2014/0279637 | A1* | 9/2014 | Rafaty | G06Q 10/1053 |
| | | | | 705/321 |
| 2014/0379473 | A1* | 12/2014 | Zhou | G06Q 30/0256 |
| | | | | 705/14.54 |
| 2015/0006414 | A1* | 1/2015 | Janapareddy | G06Q 10/1053 |
| | | | | 705/319 |
| 2015/0178790 | A1* | 6/2015 | Yi | G06Q 30/0273 |
| | | | | 705/7.31 |
| 2015/0220976 | A1* | 8/2015 | Guo | G06Q 30/0273 |
| | | | | 705/14.48 |
| 2015/0379429 | A1* | 12/2015 | Lee | G06N 20/00 |
| | | | | 706/11 |
| 2016/0162779 | A1* | 6/2016 | Marcus | G06N 20/10 |
| | | | | 706/12 |
| 2017/0043017 | A1* | 2/2017 | Obata | A61K 47/32 |
| 2017/0061528 | A1* | 3/2017 | Arora | G06F 16/958 |
| 2017/0228749 | A1* | 8/2017 | Larvol | G06Q 10/1053 |
| 2018/0046926 | A1* | 2/2018 | Achin | G06Q 10/04 |
| 2018/0108049 | A1* | 4/2018 | Kitts | G06Q 30/0275 |
| 2018/0150883 | A1* | 5/2018 | Davin | G06Q 30/0269 |
| 2018/0165717 | A1* | 6/2018 | Fidler | G06Q 30/0256 |
| 2019/0005563 | A1* | 1/2019 | Chen | G06Q 30/0625 |
| 2019/0043017 | A1* | 2/2019 | Grover | G06F 16/248 |
| 2019/0057404 | A1* | 2/2019 | Deng | G06Q 30/0202 |
| 2019/0102695 | A1* | 4/2019 | Biswas | G06F 13/102 |
| 2019/0104331 | A1* | 4/2019 | Bapna | H04N 21/23418 |
| 2020/0202299 | A1* | 6/2020 | Liang | G06Q 10/08345 |
| 2020/0210908 | A1* | 7/2020 | Liang | G06F 17/18 |

OTHER PUBLICATIONS

"Non Final Office Action Issued in U.S. Appl. No. 16/232,862", dated Oct. 6, 2020, 31 Pages.

* cited by examiner

OPTIMAL VIEW CORRECTION FOR CONTENT

RELATED APPLICATIONS

This application is a continuation-in-part of, and claiming the benefit of priority to, U.S. patent application Ser. No. 16/232,862, filed on Dec. 26, 2018, hereby incorporated by reference in its entirety.

TECHNICAL FIELD

The present disclosure generally relates to technical problems encountered in large computer networks. More specifically, the present disclosure relates to calculating optimal view correction for online content.

BACKGROUND

The rise of the Internet has occasioned two disparate yet related phenomena: the increase in the presence of online networks, such as social networking services, with their corresponding user profiles visible to large numbers of people, and the increase in the use of these online networking services to provide content. An example of such content is job listing content. Here, job listings are posted to a social networking service and these job listings are presented to users of the social networking service, either as results of job searches performed by the users in the social networking service, or as unsolicited content presented to users in various other channels of the social networking service. For example, job listings may be presented in a social networking feed on the social networking service, with a feed being a series of various pieces of content presented in reverse chronological order, such as a combination of notifications, articles, and job listings.

The online network typically will charge the entities that post certain types of content, such as job listings (e.g., companies, recruiting firms, etc.) a fee for posting the content. In some circumstances the charge for the content is an ongoing fee based on the number of users who view the content. More particularly, in some circumstances it is beneficial to allow companies to pay for "sponsored" content, which are surfaced to users in contexts within the graphical user interfaces of the online network they would not have ordinarily been seen, and to mix these sponsored pieces of content with non-sponsored pieces of content (also called "organic" content). Coordinating displaying the sponsored pieces of content within the non-sponsored pieces of content, however, can create numerous technical challenges with respect to how and how often the sponsored pieces of content should be displayed.

BRIEF DESCRIPTION OF THE DRAWINGS

Some embodiments of the technology are illustrated, by way of example and not limitation, in the figures of the accompanying drawings.

DETAILED DESCRIPTION

Overview

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, sponsored and non-sponsored pieces of content are displayed in accordance with one or more ranking functions that rank both the sponsored and non-sponsored pieces of content. The ranking functions may be different for sponsored pieces of content than for non-sponsored pieces of content, although in some embodiments a single ranking model may incorporate the different ranking models in one place. The ranking function for the sponsored pieces of content weights the sponsored piece of content based on a dynamic price attached to each impression of the piece of content. The dynamic price is determined at impression-time, and may be based on a combination of a determined "quality" of the user to which the impression will potentially show the piece of content and a budget spend established for the piece of content.

The dynamic price is known only to the online network and is not known by the entity that posts the piece of content at the time the impression is made (i.e., the entity only finds out how much it spent on a particular impression of the piece of content after the impression has been made and they have been charged). This can be challenging to implement, as it is necessary to balance a number of disparate aspects, including better budgeting and revenue usage for the entity who posted the piece of content, value delivery in presenting as many pieces of content as possible to users, and the incentive to build a healthy online network that itself is able to maximize its resource usage.

Past solutions have attempted to address these aspects using a multi-objective optimization ranking functions, which attempts to balance all of these disparate goals using the ranking algorithm alone. The result, however, is a system where there are a number of times where a sponsored piece of content is presented at zero cost to the entity that posted the piece of content. Specifically, it becomes possible for the entity posting the piece of content to have their daily budget used up too early, and the system, in an effort to maximize value to the user, will set the price of an impression of a piece of content at zero. This has a tendency to disincentivize entities that would otherwise have sponsored content. Thus, in an example embodiment, a ranking function other than a multi-objective optimization function is used and additional mechanisms are used to address the challenges of balancing the disparate goals of the online network, the entity posting the piece of content, and the user.

Additionally, the price of an impression, while dynamically set at impression time, may be based on a base bid that is something of a rough indicator of what the estimated price will be. That base bid then is adjusted dynamically up or down at impression time. This base bid can be determined by dividing the expected number of impressions for a day by the total daily budget. The expected number of impressions may be determined by using the empirical number of impressions from the previous day. The problem is that that this number may be based on suboptimal input as it is possible that the bid price for the previous day's impressions were set too high (resulting in a number of impressions being made at no charge) or too low (resulting in the budget not being used). As such, in an example embodiment, the prediction of the number of impressions for a day utilizes a corrected version of the empirical number of impressions from the prior day, with the corrected version based on a specialized formula.

Description

The disclosed embodiments provide a method, apparatus, and system for performing dynamic optimization of content impressions, and specifically dynamically setting a price for each content impression. It should be noted that for ease of understanding, a particular type of content, specifically job listings, will be described in detail in this disclosure. Nothing in this disclosure shall be read, however, as specifically limiting implementation of the techniques described herein to job listings, and the claims shall not be interpreted as being limited to job listings unless explicitly stated.

In an example embodiment, sponsored pieces of content are posted within an online network such as a social networking service. Each sponsored piece of content is associated with a daily and/or other time-based budget that is spent as users are provided with impressions of the piece of content. An impression may be considered to be a display of the sponsored piece of content in a manner that causes a charge to be incurred. In an example embodiment, displaying a sponsored piece of content in a list of pieces of content is considered to be an impression, while subsequent interactions the user has with the sponsored piece of content are called "interactions". In the case of job listings, these subsequent interactions may include clicking on the job listing to view the job listing in more detail, applying to the job listing, and/or perform other actions related to the job listing. As a result, prices for sponsored pieces of content may be dynamically adjusted so that a daily budget, set by an entity posting the sponsored piece of content, can be consumed over the course of the day instead of running out too early and/or failing to be used up by the end of the day. Additionally, prices for sponsored content impressions may also be dynamically adjusted to improve application rates, applicant quality, and/or other performance factors related to the sponsored pieces of content.

More specifically, in an example embodiment, initial prices for pieces of sponsored content, called base bids, are set based on predictions of subsequent interactions with the sponsored pieces of content and daily budgets for the sponsored pieces of content. For example, one or more machine learned models may be used to predict the number of clicks, applications, and/or other types of interactions with a sponsored piece of content over a day based on historical time-series data associated with the interactions. An initial price for the sponsored piece of content may then be calculated by dividing the sponsored piece of content's daily budget by the predicted number of interactions. In an example embodiment, this predicted number of interactions is based on a corrected version of the number of impressions from the previous day.

The poster of a sponsored piece of content may set daily budgets for the sponsored content, from which costs are deducted as the users view the pieces of content. If a sponsored piece of content's budget is fully consumed before the end of the day, the sponsored piece of content may continue to be delivered to members (e.g., in search results and/or recommendations) until the end of the day without further charging the poster. Moreover, sponsored pieces of content with depleted budgets may occupy space in rankings that are shown to the users, which may prevent the online network from surfacing other sponsored pieces of content to the members and/or utilizing the budgets for the other sponsored pieces of content.

At impression-time, dynamic adjustments to the base bids are determined to improve utilization of the budgets and/or the performance of the impression. For example, a dynamic adjustment for improving utilization of a sponsored piece of content's budget may be calculated based on the actual spending for the sponsored piece of content at the current time and an expected spending for the sponsored piece of content generated by a pacing curve for the piece of content at the current time. A pacing curve is a measure of the pace at which impressions of a piece of content are being made. Impression-time is the time at which the online network retrieves and displays sponsored pieces of content to a particular user, and more particularly the time at which the online network has determined to display a particular sponsored piece of content to a particular user, but needs to determine the exact price of the impression. In another example embodiment, in a case where the sponsored content is a sponsored job listing, a dynamic adjustment for improving the performance of a sponsored job listing may be calculated based on factors such as the application rate for the job, an application rate for a job segment of the job listing, an applicant quality associated with applicants for the sponsored job listing, and/or an application quality associated with applications to job listings in the job segment.

Figure 1:
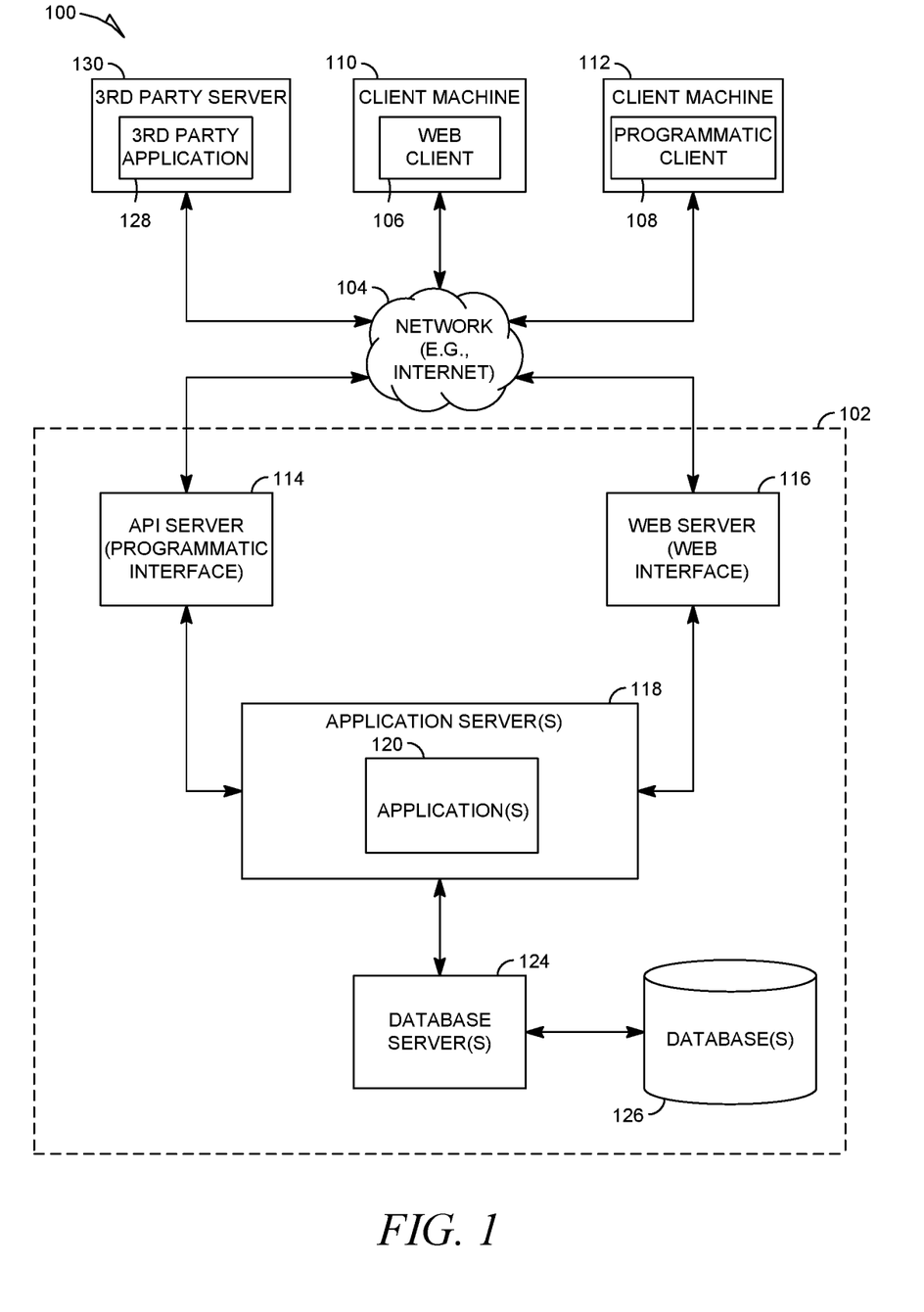
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third-party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
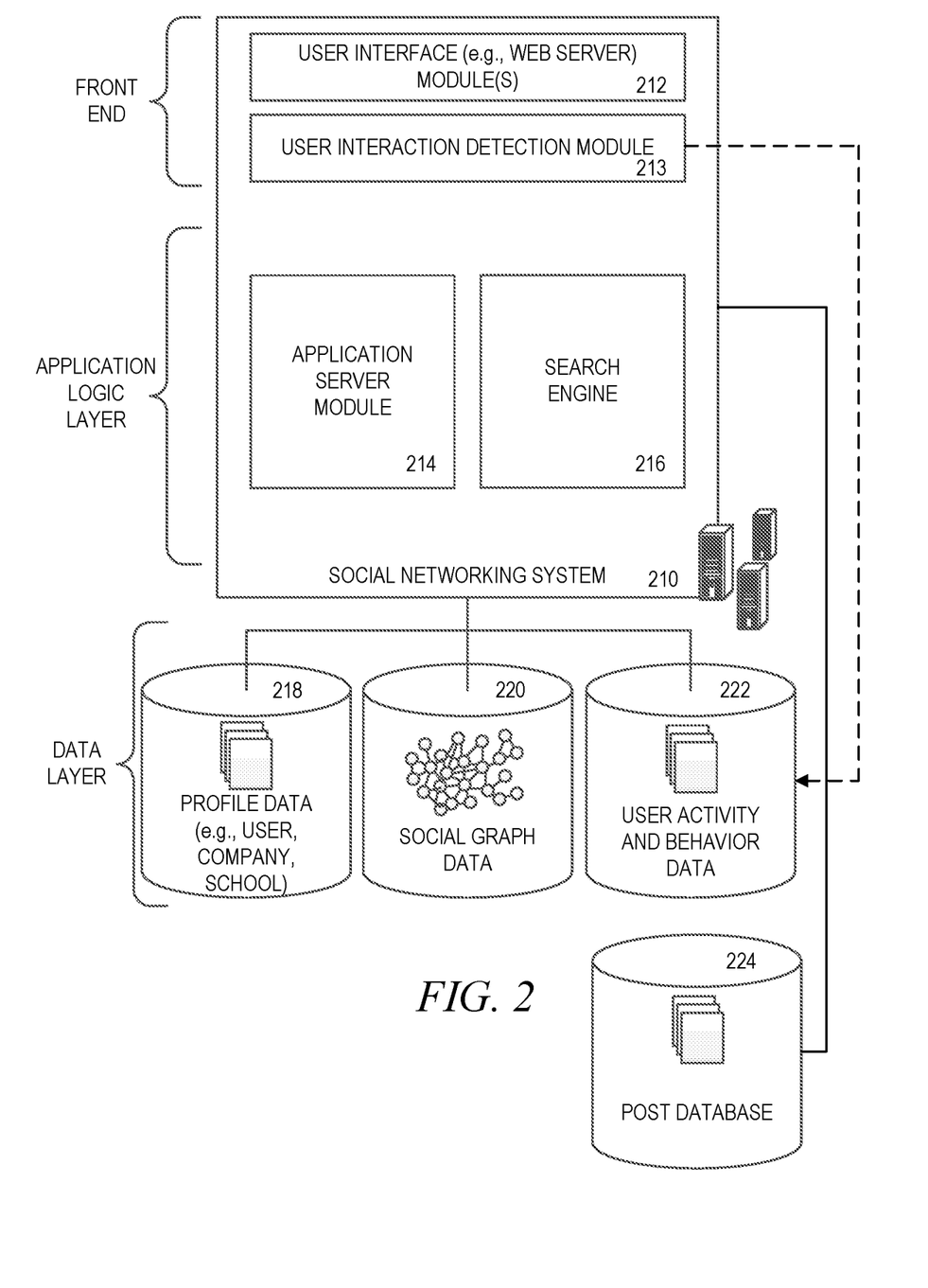
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices and communicates appropriate responses to the requesting client devices. For example, the user interface module(s) 212 may receive requests in the form of Hypertext Transfer Protocol (HTTP) requests or other web-based API requests. In addition, a user interaction detection module 213 may be provided to detect various interactions that users have with different applications 120, services, and content presented. As shown in FIG. 2, upon detecting a particular interaction, the user interaction detection module 213 logs the interaction, including the type of interaction and any metadata relating to the interaction, in a user activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases 126, such as a profile database 218 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 220.

As users interact with the various applications 120, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 2, by the user activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking system 210 provides an API module via which applications 120 and services can access various data and services provided or maintained by the social networking service. For example, using an API, an application may be able to request and/or receive one or more recommendations. Such applications 120 may be browser-based applications 120 or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and user activity and behavior data (stored, e.g., in the user activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

As described above, example embodiments may be utilized for ranking and/or selection of social media posts to display to users. These social media posts may be directly or indirectly generated from user activity within the social networking service and may be stored in post database 224. Examples of social media posts directly generated from user activity include the users themselves posting text, image, or video information as a post. Examples of social media posts indirectly generated from user activity include the social networking service itself generating the post when the user has a change in their profile, when the user is mentioned in an article, and so forth.

Figure 3:
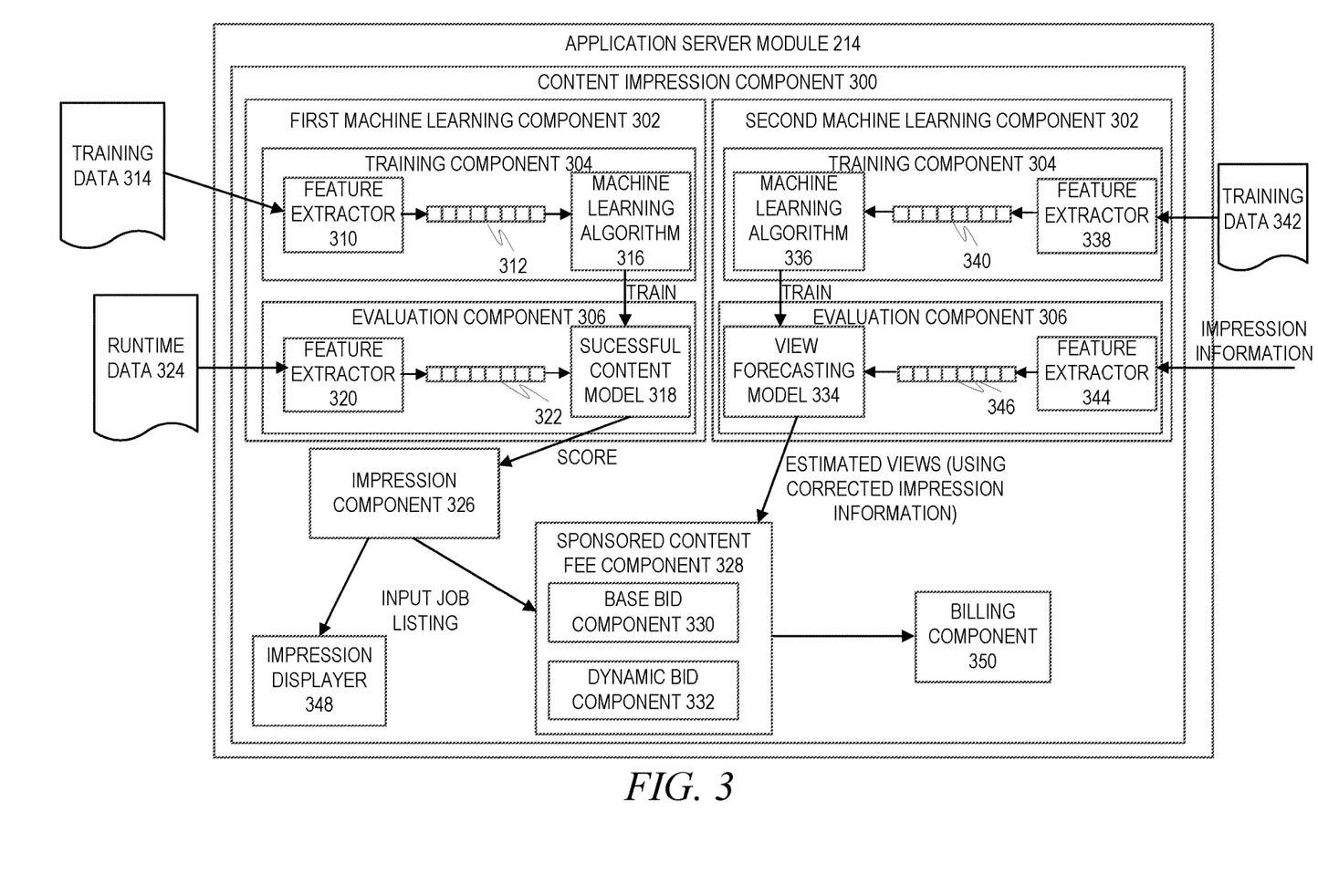
FIG. 3 is a block diagram illustrating an application server module of FIG. 2 in more detail, in accordance with an example embodiment.

FIG. 3 is a block diagram illustrating application server module 214 of FIG. 2 in more detail, in accordance with an example embodiment. While in many embodiments the application server module 214 will contain many subcomponents used to perform various different actions within the social networking system 210, in FIG. 3 only those components that are relevant to the present disclosure are depicted.

A content impression component 300 may receive, at runtime, one or more job listings and determine which users of the online network to present the job listings to as "impressions". An impression is a single display of the job listing in a graphical user interface. There may be numerous ways these impressions may be presented and numerous channels on which these impressions may be presented. For example, the impressions may be presented in an email to a user, in a feed of the online network, or as results of a job search. Some of these impressions may be for job listings where the corresponding entity that posted the job listing has agreed to pay for the impression. Such impressions are called "sponsored impressions". It should be noted that there is a distinction between the corresponding entity having agreed to pay for the impression and the corresponding entity actually paying for the impression. As mentioned previously, it is possible that the entity may have agreed to pay for an impression but, at the time the impression is made, the daily budget established by the entity has been used up, and thus it becomes possible for the sponsored impression to be displayed without an actual charge being applied to the entity's account.

More particularly, companies may establish a daily budget they want to spend and a cost per impression based on a predicted number of impressions that they believe will occur each day. The actual display of the job listings, however, are based on a variety of factors that may vary based on the individual sets of users potentially served the job listing on a particular day. The result is that in some cases the predicted number of impressions may be reached before the day is up, leading the online network to be presented with a choice: stop displaying the job listing for the remainder of the day (which may result in no sponsored job listings being presented to a user later that day, which is not an optimal use of resources) or display the job listing without charging for it (essentially giving away impressions for free). From the technical perspective, the problem is that there is an area of the graphical user interface that is available to be used for a particular type of content (in this case, sponsored job listings) but that available area is not being utilized in an efficient manner in certain circumstances.

In an example embodiment, two different machine learned models are utilized to establish and refine the price set for each impression of a piece of sponsored content in the online network. It should be noted that organic content may be ranked separately using its own, independent ranking model, or the function(s) related to ranking the organic content may be integrated into the first machine learned model used for the sponsored pieces of content described below. The organic ranking functions are beyond the scope of the present disclosure, as the technical problems being addressed apply to sponsored content and not organic content. The first machine learned model is used to estimate the likelihood that display of a piece of sponsored content is "successful." Success may be defined differently for different types of sponsored content, and will be described in more detail below. The score is then used to determine whether to display a particular sponsored piece of content to a particular user. If a piece of content is sponsored, display of the piece of content causes a charge to be assigned to the impression and the charge deducted from an entity's daily budget. The price charged for the sponsored piece of content is based on a bid that is calculated by first establishing a base bid for the sponsored piece of content. This base bid is based on an estimate of the number of views of the pieces of content. The second machine learned model is used to provide a correction of this estimated number of views of the sponsored pieces of content, thus making this dynamic bid more reliable. The base bid is then dynamically modified at impression-time to establish the actual price charged for a particular impression of the sponsored piece of content.

The job listing impression component 300 may include a first machine learning component 302. The machine learning component may include a training component 304 and an evaluation component 306. The training component 304 uses feature extractor 310 to extract one or more features 312 from training data 314. The training data 314 may include, for example, user profiles, corresponding user activity information (e.g., interactions the users made with the online network), and historical job listing information. The one or more features 312 may then be fed to a machine learning algorithm 316 that trains a successful content model 318. The successful content model 318 may be specifically trained to output a score for an input user based on a likelihood that, if the input user is presented with the content, then that sponsored piece of content will be "successful". Success in this context may be defined in a number of different ways based on the objectives of the designer of the successful content model 318. For job listings, while the input user clicking on or otherwise selecting the job listing may be considered as a factor as being successful, it is not the only factor. In an example embodiment, a successful job listing is one in which the input user is a quality applicant and is likely to apply for the job associated with the job listing. A quality applicant may be defined as an applicant who is likely to obtain the job associated with the job listing if he or she applies, and may be based on factors such as whether the user has skills, education, experience, industry, and title that match qualifications of the job listing. Quality may also include whether or not there have been social and/or other validation of the input user's profile data (e.g., endorsement of skills, recommendations, accomplishments, awards, etc.) and a likelihood that the input user is actively looking for a job (e.g., a "job-seeker"). In an example embodiment, the machine learning algorithm 316 may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method At runtime, feature extractor 320 may extract one or more features 322 from runtime data 324. The runtime data 324 may include the input user's profile, activity information, and information about a particular sponsored piece of content being considered. The one or more features 322, which then correspond just to the input user and the particular sponsored piece of content being considered, are passed to the successful content model 318, which outputs a score for the combination of the input user and the particular sponsored piece of content being considered. This score is then passed to an impression component 326. The impression component 326 then determines whether or not to display the sponsored piece of content being considered to the user based on this score. In an example embodiment, this is performed by comparing the score to the score of other sponsored pieces of content being considered. In the case where the pieces of content are sponsored, there may be a certain number of designated "slots" for display of sponsored pieces of content among organic pieces of content. For example, there may be three slots for sponsored pieces of content for every seventeen slots for organic pieces of content. In an example embodiment, only those sponsored pieces of content whose scores are in the top number of scores of sponsored pieces of content will be displayed. Thus, in the above example, if the sponsored piece of content being considered has a score within the top three scores of the sponsored pieces of content being considered for the input user, then it will be displayed. In other example embodiments, the scores are compared to a predetermined threshold and only if that threshold is transgressed are the corresponding sponsored pieces of content displayed.

A sponsored content fee component 328 includes a base bid component 330 and a dynamic bid component 332. The base bid component 330 establishes a base bid for the sponsored piece of content being considered. As described earlier, this base bid was typically determined using the prior day's empirical number of impressions of the sponsored piece of content being considered and a daily budget for the sponsored piece of content. In an example embodiment, a view forecasting model 334 is used to forecast the number of impressions of the sponsored piece of content being considered for the next day. As will be described in more detail below, while the prior day's empirical number of impressions is used as a basis for this model, the model corrects the empirical number of impressions by applying one or more specialized functions. The base bid is determined by dividing the daily budget by the corrected empirical number of impressions.

At runtime, and particularly when the online network is determining whether or not to display an impression of the sponsored piece of content being considered to the input user, the dynamic bid component 332 dynamically adjusts the base bid to an actual bid that is then charged to the entity who posted sponsored piece of content being considered.

In the case of sponsored job listings, by dynamically setting and adjusting prices of sponsored job listings based on objectives related to the sponsored job listing's budget utilization, performance, and/or popularity, utilization of the job listing's budget is increased, the value of the job listings to the entities posting the sponsored job listings and to applicants is increased, and the delivery of the sponsored job listings is performed in a manner that reflects recent feedback and/or activity related to the jobs. In an example embodiment, traffic distribution in sponsored job listing slots reflects the popularity of the job listings. Base bid price is used as a factor to achieve this. If the base bid price is too high, popular jobs may run out of budget through a few views and will no longer have opportunities to show up in promoted slots. This is bad for economic incentive, paid value delivered to job listings and job seeker experience. If the base bid price is set too low, unpopular jobs might miss opportunities in the early hours of a day to deliver value.

From a spending perspective, it is ideal to maximize the job listing's spend within budget:

$$\max \sum_{i}^{N} bid_i, \text{ s.t. } Sa < B$$

where bid_i is the bid price of the ith impression of a sponsored job listing, N is the total number of impressions for a sponsored job listing in a day, Sa is the actual spend of the job listing, and B is the daily budget of the jobs. The sum of all the bid prices results in the actual spend, but the spend needs to be within the daily budget.

In an example embodiment, two variables are introduced to aid in setting the base bid price and evaluating the number of impressions of a sponsored job listing to be served in a day. Specifically, λ, is defined as the percentage of impressions for a particular job listing that are for a monetary amount greater than zero and that are made while there is still daily budget to pay for the impression. Additionally, μ is defined as the percentage of the daily budget that has been utilized. The number of job views for a particular sponsored job listing j in a particular day d can therefore be represented by the function:

$$jobViews_{j,d} = f(budget_j, bid_{j,d}, \text{impression requests}_{j,d}, \lambda, \mu).$$

In the ideal scenario, it would be beneficial to utilize all of the impression requests and all of the budget (μ=100%). The optimal bid is the bid price that is able to reach 100% budget utilization and 100% request utilization rate, as well as the maximum number of impressions. When the bid is incorrectly set, either μ or λ (or both) will be something other than 100%.

If the bid is too high, then μ is equal to 100% but λ is less than 100%, and a variable called the view through ratio (defined as the ratio of selections by a user to view a more detailed version of the sponsored job listing (e.g., by clicking on a less detailed version of the sponsored job listing to see more details) to the number of impressions of the job listing) is greater than optimal (thus causing the budget to be exceeded too early).

If the bid is too low then μ is less than 100% but λ is equal to 100%, and the view through ratio is less than optimal (thus causing the budget to not be used up over the course of the day).

In an example embodiment, the job listing view forecasting model 334 may be represented as follows:

$$predictedViews_{j,d} =$$
$$\theta^T X + w_1 jobViewsCorrected_{j,d-1} \cdot f\left(\frac{dailyBudget_d}{dailyBudget_{d-1}}\right) +$$
$$w_2 jobViewsCorrected_{j,d-2} \cdot f\left(\frac{dailyBudget_d}{dailyBudget_{d-2}}\right) \text{ with}$$

$$\text{base } bid_{j,d} = \frac{dailybudget_{j,d}}{predictedViews_{j,d}} \text{ with bounds}$$

$$jobViewsCorrected_{j,d} = \frac{1}{\lambda f_v(\lambda) g_v(u)} \cdot jobViews_{j,d} \text{ when}$$

$$jobView_{j,d} > 0$$

jobViewsCorrected$_{j,d}$ is the corrected number of job views of sponsored job listing j to spend 100% of daily budget at day d, which will then be used to predict job views in the coming day. Further $$g_v(u) = aln(\beta u) + \theta \quad f_v(\lambda) = \frac{1}{aln(b\lambda + c) + d}$$

In the view forecasting model 334, α, β, θ, a, b, c, and d are weights learned by a machine learning algorithm 336 during a training process. Specifically, feature extractor 338 extract one or more features 340 from training data 342. Since the successful content model 318 is being trained to output a score indicating the likelihood of a sponsored piece of content being "successful" if displayed to a user while the view forecasting model 334 is being trained to indicate an estimated number of views of the piece of content in a day, the training data 342 may somewhat overlap with training data 314 but not completely. The training data 34 may include, for example, user activity information (e.g., interactions the users made with the online network). The one or more features 340 may then be fed to the machine learning algorithm 336 that trains the view forecasting model 334.

In an example embodiment, the machine learning algorithm 336 learns the weights α, β, θ for g$_v$(u)=aln(βu)+θ and a, b, c and d in $$f_v(\lambda) = \frac{1}{aln(b\lambda + c) + d}$$

by finding the combination of weights that minimizes a sum of squares of errors in the training data 342. More particularly, in an iterative fashion, the estimated view through rate predicted for certain portions of training data 342 by the job listing view forecasting model for a particular combination of the weights is subtracted from the actual view through rate of the training data 342, and this difference is squared. The square is then summed with the calculated square for other portions of the training data 342 being examined. It should be noted that in an example embodiment, the weights for g$_v$(u)=aln(βu)+θ are trained independently of the weights for $$f_v(\lambda) = \frac{1}{aln(b\lambda + c) + d}.$$

In an example embodiment, the one or more features 340 may include views from the last time period (e.g., last day), views from the last two time periods (e.g., last two days), the day of the week, how long the job associated with the sponsored job listing has been open, which day in a pay per click cycle it is, job title of the job associated with the sponsored job listing, experience level of the job associated with the job listing, a type of the sponsored job listing (e.g., manual post or posted automatically), and whether the sponsored job listing is a pay per click job listing.

In an example embodiment, the job listing view forecasting model 334 analyzes time-series data to predict a number of interactions with a job listing over a period. For example, a time series of clicks, applies, and/or other types of interactions with the job listing over a preceding number of days may be obtained and a time series may be used to estimate the occurrence of the same types of interactions over a subsequent day. The job listing view forecasting model 334 may be, for example, an exponential smoothing model, a Holt-Winters double or triple exponential smoothing model, a linear regression model, or any other type of supervised or unsupervised machine learned model, such as a neural network.

At runtime, recent impression information may be passed to feature extractor 344, which may extract one or more features 346. In an example embodiment, feature extractor 344 extracts the same types of features as feature extractor 338. The one or more features 346 are then passed to the job listing view forecasting model 334, which outputs an estimate of the number of daily views (using the corrected impression information). This estimate is then passed to the sponsored content fee component 328, which may use it in determining a base bid.

Specifically, as described earlier, the dynamic bid component 332 may make a dynamic adjustment to the base bid based on the actual spending for the sponsored job listing at the current time and an expected spending for the job listing generated by a pacing curve for the sponsored job listing at the current time. In another example embodiment, a dynamic adjustment for improving the performance of a sponsored job listing may be calculated based on factors such as the application rate for the job, an application rate for a job segment of the sponsored job listing, an applicant quality associated with applicants for the sponsored job listing, and/or an application quality associated with applications to sponsored job listings in the job segment.

Impression displayer 348 then causes the input sponsored job listing to be displayed for a particular user while billing component 350 causes the entity posting the input sponsored job listing to be billed for the impression at the rate set by the dynamic bid component 332.

Figure 4:
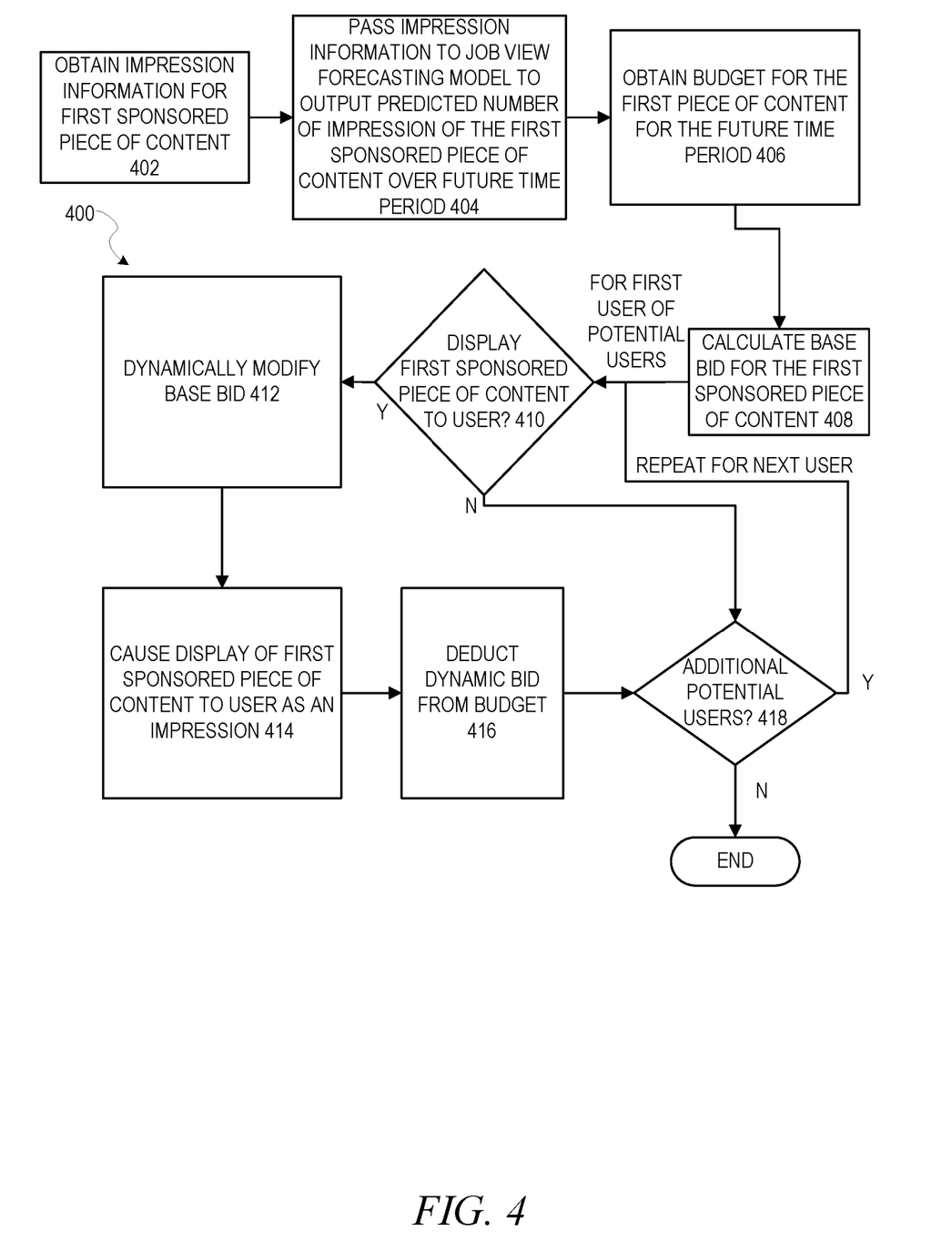
FIG. 4 is flow diagram illustrating a method for causing an impression of a job listing on a graphical user interface in an online network in accordance with an example embodiment.

FIG. 4 is flow diagram illustrating a method 400 for causing an impression of a sponsored piece of content on a graphical user interface in an online network in accordance with an example embodiment. At operation 402, impression information is obtained for a first sponsored piece of content. The impression information includes a count of a number of impressions of the first sponsored piece of content displayed in an online network over a first time period. At operation 404, the impression information is passed to a view forecasting model to output a predicted number of impressions of the first sponsored piece of content over a future time period. The future time period may be equal in length to the first time period. The view forecasting model is a machine learned model trained by a machine learning algorithm to output a predicted number of impressions of the first sponsored piece of content over a future time period, based on a corrected version of the count of the number of impressions of the first sponsored piece of content over the first time period. The corrected version is produced in the view forecasting model by a formula having one or more weights learned during the training of the view forecasting model.

At operation 406, a budget for the first sponsored piece of content for the future time period is obtained. This budget may, for example, be set by an entity that is posting the first sponsored piece of content, such as, in the case of the content being a job listing, a company that is hiring for the job associated with the sponsored job listing or a recruiter facilitating the hiring for the sponsored job listing. At operation 408, a base bid for the first sponsored piece of content is calculated based on the budget and the predicted number of impressions of the first sponsored piece of content over the future time period. This may be calculated by dividing the budget by the predicted number of impressions of the first sponsored piece of content over the future time period.

A loop is then begun for a number of users who may potentially be displayed the first sponsored piece of content. At operation 410, it is determined whether or not to display the first sponsored piece of content to the user. If not, then the method 400 loops back to operation 410 for the next user. If so, then at operation 412, the base bid is dynamically modified based on one or more attributes of the user, to produce a dynamic bid for the first sponsored piece of content. At operation 414, the first sponsored piece of content is caused to be displayed to the user in the graphical user interface as an impression. At operation 416, the dynamic bid is deducted from the budget. At operation 418, it is determined if there are any additional users who may potentially be displayed the first sponsored piece of content. If no, then the method 400 ends. If so, then the method 400 loops back to operation 410 for the next user.

Figure 5:
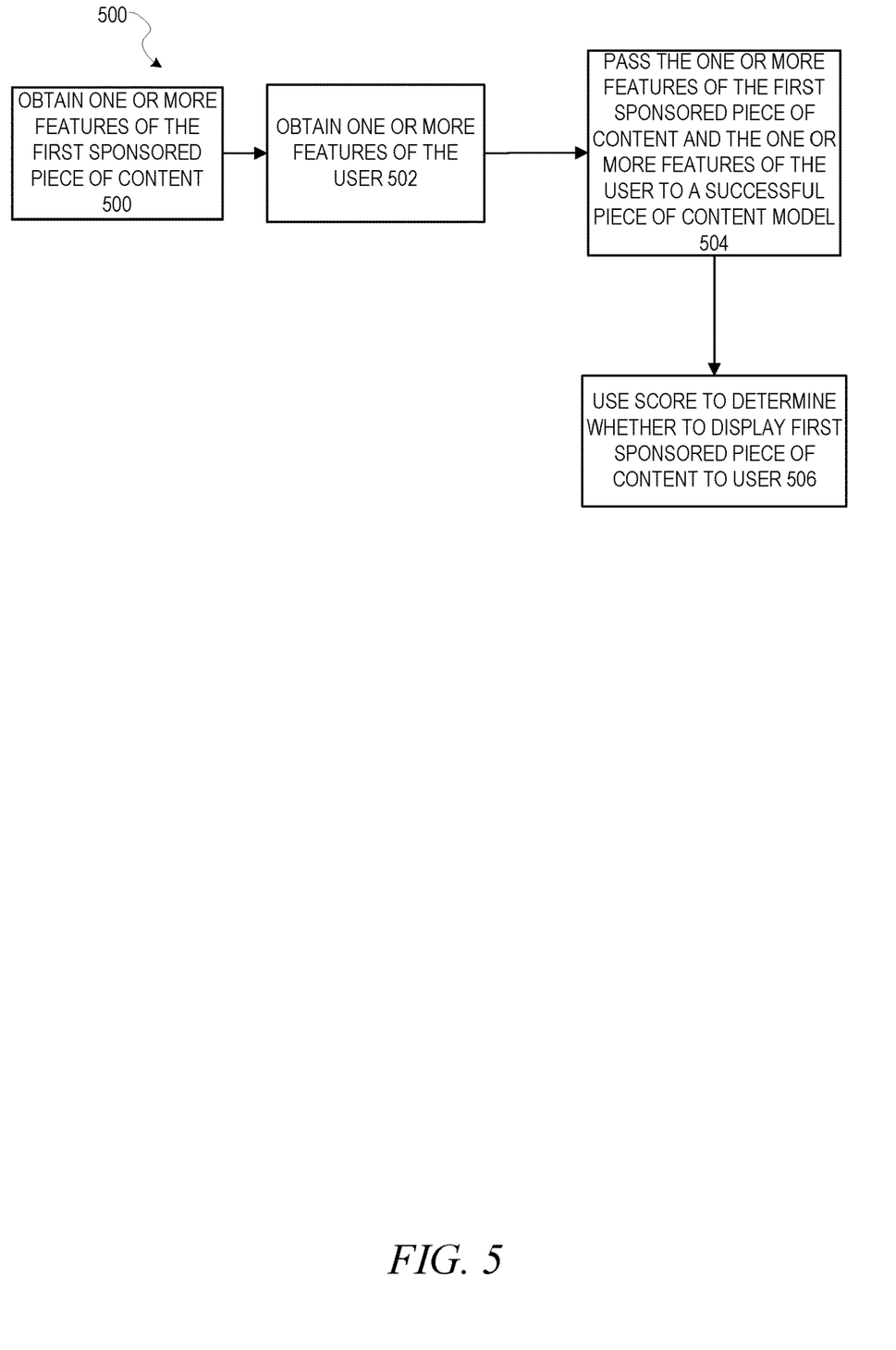
FIG. 5 is a flow diagram illustrating a method of determining whether or not to display the first job listing to the user, in accordance with an example embodiment.

FIG. 5 is a flow diagram illustrating an operation 410 of determining whether or not to display the first sponsored piece of content to the user, in accordance with an example embodiment. At operation 500, one or more features of the first sponsored piece of content are obtained. These features may include, for example, in the case of the content being a job listing, prerequisites for the job associated with the job listing that are listed in the job listing and past interaction history of users interacting in the graphical user interface of the online network with the job listing. At operation 502, one or more features of the user are obtained. These features may include, for example, background and skills of the user as listed in a user profile and past interaction history of the user interacting in the graphical user interface of the online network with pieces of content. At operation 504, the one or more features of the first sponsored piece of content and the one or more features of the user are passed to a successful content model, which is a machine learned model trained by a machine learning algorithm to output a score indicative of a likelihood that display of the first sponsored piece of content to the first user will result in a positive interaction by the first user with the first sponsored piece of content in a graphical user interface of the online network. The positive interaction may be, for example, a click or an apply.

At operation 506, the score is used to determine whether to display the first sponsored piece of content to the user. This may be performed by, for example, comparing the score to a predetermined threshold and determining whether to display the first sponsored piece of content to the user if the threshold is transgressed, or by ranking the score against scores for other user/piece of content combinations and determining to display the advertisement if the score is within a top preset number of scores.

Figure 6:
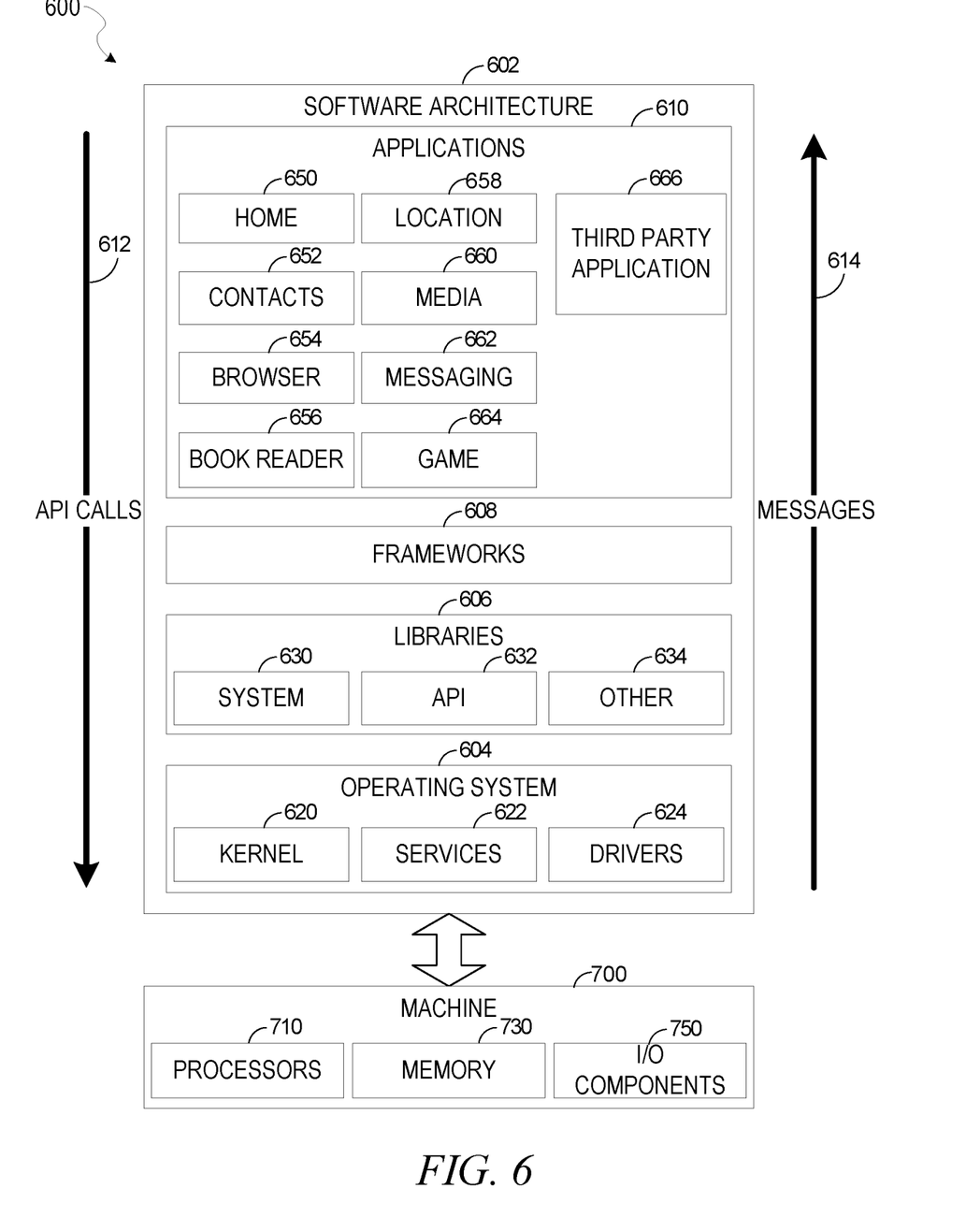
FIG. 6 is a block diagram illustrating a software architecture, in accordance with an example embodiment.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 800 of FIG. 8 that includes processors 810, memory 830, and input/output (I/O) components 850. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
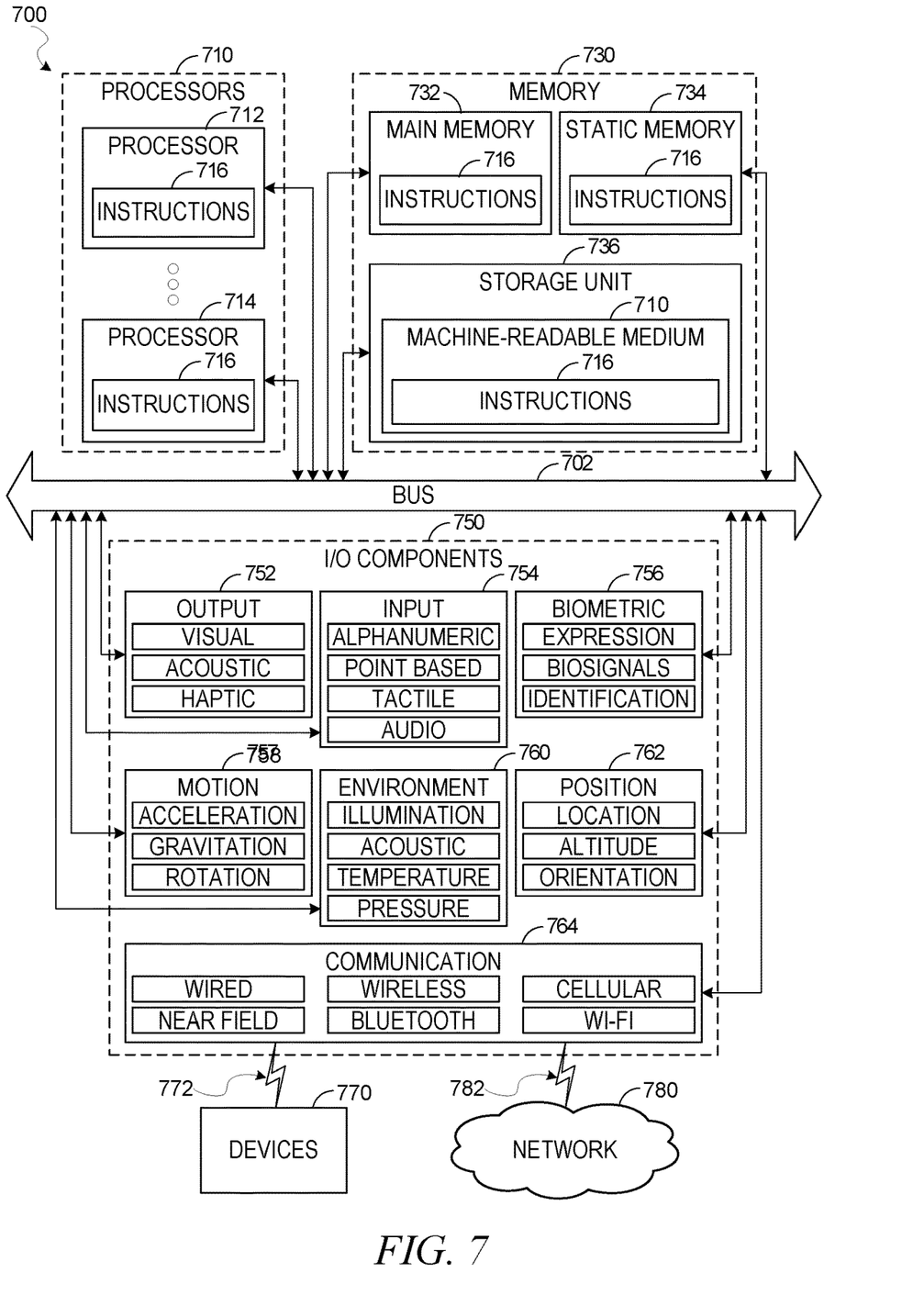
FIG. 7 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application 610, an applet, an app, or other executable code) for causing the machine 700 to perform any one or more of the methodologies discussed herein may be executed. For example, the instructions 716 may cause the machine 700 to execute the method 400 of FIG. 4. Additionally, or alternatively, the instructions 716 may implement FIGS. 1-5, and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors 712 (sometimes referred to as "cores") that may execute instructions 716 contemporaneously. Although FIG. 7 shows multiple processors 710, the machine 700 may include a single processor 71 with a single core, a single processor 712 with multiple cores (e.g., a multi-core processor), multiple processors 710 with a single core, multiple processors 710 with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 32, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine 700 will depend on the type of machine 700. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 716 and/or data. The terms shall accordingly be taken to include, but not be limited to, solid-state memories, and optical and magnetic media, including memory internal or external to the processors 710. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   a computer-readable medium having instructions stored thereon, which, when executed by a processor, cause the system to perform operations comprising:
   training a view forecasting model by passing a plurality of features extracted from training data to a machine learning algorithm, causing the machine learning algorithm to repetitively alter values for one or more weights until a sum of squares of a difference between a view through ratio of the training data and a predicted view through ratio from a portion of the view forecasting model is minimized;
   obtaining impression information for a first sponsored piece of content, the impression information including a count of a number of impressions of the first sponsored piece of content displayed in an online network over a first time period;
   passing the impression information to a view forecasting model to output a predicted number of impressions of the first sponsored piece of content over a future time period, based on a corrected version of the count of the number of impressions of the first sponsored piece of content over the first time period, the corrected version produced in the view forecasting model by a formula having the one or more weights learned during the training of the view forecasting model, the corrected version being a version in which the count of the number of impressions of the first sponsored piece of content displayed in the online network over the first time period has been fixed;
   obtaining a budget for the first sponsored piece of content for the future time period;
   calculating a base bid for the first sponsored piece of content based on the budget and the predicted number of impressions of the first sponsored piece of content over the future time period;
   determining to display the first sponsored piece of content to a first user;
   subsequent to the determining, dynamically updating the base bid based on one or more attributes of the first user, to produce a dynamic bid for the first sponsored piece of content; and
   causing the dynamic bid to be deducted from the budget.

2. The system of claim 1, wherein the calculating the base bid includes dividing the budget by the predicted number of impressions of the first sponsored piece of content over the future time period.

3. The system of claim 2, wherein the determining to display the first sponsored piece of content to the first user includes passing the one or more features of the first sponsored piece of content and the one or more features of the first user to a successful content model, the successful content model being a machine learned model trained by a machine learning algorithm to output a score indicative of a likelihood that display of the first sponsored piece of content to the first user will result in a positive interaction by the first user with the first sponsored piece of content in a graphical user interface of the online network.

4. The system of claim 3, wherein the positive interaction is a click.

5. The system of claim 3, wherein the piece of content is a job listing and the positive interaction is the user applying for a job associated with the job listing through the graphical user interface.

6. The system of claim 3, wherein the successful content model is a neural network.

7. The system of claim 1, wherein the operations further comprise displaying the first sponsored piece of content to the first user as an impression in a graphical user interface of the online network.

8. The system of claim 1, wherein the impression is displayed in a slot designated for sponsored pieces of content on a screen of the graphical user interface, the slot interleaved with one or more slots designated for organic pieces of content.

9. A computerized method comprising:
training a view forecasting model by passing a plurality of features extracted from training data to a machine learning algorithm, causing the machine learning algorithm to repetitively alter values for one or more weights until a sum of squares of a difference between a view through ratio of the training data and a predicted view through ratio from a portion of the view forecasting model is minimized;
obtaining impression information for a first sponsored piece of content, the impression information including a count of a number of impressions of the first sponsored piece of content displayed in an online network over a first time period;
passing the impression information to a view forecasting model to output a predicted number of impressions of the first sponsored piece of content over a future time period, based on a corrected version of the count of the number of impressions of the first sponsored piece of content over the first time period, the corrected version produced in the view forecasting model by a formula having the one or more weights learned during the training of the view forecasting model, the corrected version being a version in which the count of the number of impressions of the first sponsored piece of content displayed in the online network over the first time period has been fixed;
obtaining a budget for the first sponsored piece of content for the future time period;
calculating a base bid for the first sponsored piece of content based on the budget and the predicted number of impressions of the first sponsored piece of content over the future time period;
determining to display the first sponsored piece of content to a first user;
subsequent to the determining, dynamically updating the base bid based on one or more attributes of the first user, to produce a dynamic bid for the first sponsored piece of content; and
causing the dynamic bid to be deducted from the budget.

10. The method of claim 9, wherein the calculating the base bid includes dividing the budget by the predicted number of impressions of the first sponsored piece of content over the future time period.

11. The method of claim 10, wherein the determining to display the first sponsored piece of content to the first user includes passing the one or more features of the first sponsored piece of content and the one or more features of the first user to a successful content model, the successful content model being a machine learned model trained by a machine learning algorithm to output a score indicative of a likelihood that display of the first sponsored piece of content to the first user will result in a positive interaction by the first user with the first sponsored piece of content in a graphical user interface of the online network.

12. The method of claim 11, wherein the positive interaction is a click.

13. The method of claim 11, wherein the piece of content is a job listing and the positive interaction is the user applying for a job associated with the job listing through the graphical user interface.

14. The method of claim 11, wherein the successful content model is a neural network.

15. The method of claim 9, wherein the operations further comprise displaying the first sponsored piece of content to the first user as an impression in a graphical user interface of the online network.

16. The method of claim 9, wherein the impression is displayed in a slot designated for sponsored pieces of content on a screen of the graphical user interface, the slot interleaved with one or more slots designated for organic pieces of content.

17. A system comprising:
means for training a view forecasting model by passing a plurality of features extracted from training data to a machine learning algorithm, causing the machine learning algorithm to repetitively alter values for one or more weights until a sum of squares of a difference between a view through ratio of the training data and a predicted view through ratio from a portion of the view forecasting model is minimized;
means for obtaining impression information for a first sponsored piece of content, the impression information including a count of a number of impressions of the first sponsored piece of content displayed in an online network over a first time period;
means for passing the impression information to a view forecasting model to output a predicted number of impressions of the first sponsored piece of content over a future time period, based on a corrected version of the count of the number of impressions of the first sponsored piece of content over the first time period, the corrected version produced in the view forecasting model by a formula having the one or more weights learned during the training of the view forecasting model, the corrected version being a version in which the count of the number of impressions of the first sponsored piece of content displayed in the online network over the first time period has been fixed;
means for obtaining a budget for the first sponsored piece of content for the future time period;
means for calculating a base bid for the first sponsored piece of content based on the budget and the predicted number of impressions of the first sponsored piece of content over the future time period;
means for determining to display the first sponsored piece of content to a first user;
means for subsequent to the determining, dynamically updating the base bid based on one or more attributes of the first user, to produce a dynamic bid for the first sponsored piece of content; and
means for causing the dynamic bid to be deducted from the budget.

* * * * *

UNITED STATES PATENT AND TRADEMARK OFFICE
CERTIFICATE OF CORRECTION

PATENT NO. : 11,263,661 B2
APPLICATION NO. : 16/895587
DATED : March 1, 2022
INVENTOR(S) : Keqing Liang Page 1 of 1

It is certified that error appears in the above-identified patent and that said Letters Patent is hereby corrected as shown below:

In the Claims

In Column 20, Line 15, in Claim 1, after "comprising:", insert --¶a processor, and:--

In Column 20, Line 17, in Claim 1, delete "a" and insert --the-- therefor

In Column 20, Lines 17-18, in Claim 1, after "processor,", delete "cause the system to"

In Column 20, Line 32, in Claim 1, delete "a" and insert --the-- therefor

In Column 21, Line 36, in Claim 9, delete "a" and insert --the-- therefor

In Column 22, Line 39, in Claim 17, delete "a" and insert --the-- therefor

Signed and Sealed this
Twentieth Day of September, 2022

Katherine Kelly Vidal
*Director of the United States Patent and Trademark Office*